(12) United States Patent
Salapaka et al.

(10) Patent No.: US 7,574,736 B2
(45) Date of Patent: Aug. 11, 2009

(54) SYSTEM AND METHOD FOR EFFICIENTLY TRANSFERRING MEDIA ACROSS FIREWALLS

(75) Inventors: Rao Salapaka, Redmond, WA (US); Srikanth Shoroff, Sammamish, WA (US); Gur Kimchi, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 571 days.

(21) Appl. No.: 10/792,349

(22) Filed: Mar. 3, 2004

(65) Prior Publication Data

US 2005/0198499 A1    Sep. 8, 2005

(51) Int. Cl.
*G06F 17/00* (2006.01)
(52) U.S. Cl. .............................. 726/13; 726/14; 726/15
(58) Field of Classification Search ........................ None
See application file for complete search history.

(56) References Cited

U.S. PATENT DOCUMENTS

| | | | | |
|---|---|---|---|---|
| 6,606,708 | B1 * | 8/2003 | Devine et al. ................... | 726/8 |
| 7,324,523 | B2 * | 1/2008 | Dacosta ................. | 370/395.41 |
| 2002/0150092 | A1 * | 10/2002 | Bontempi et al. ........... | 370/389 |
| 2002/0156903 | A1 * | 10/2002 | Bach Corneliussen ...... | 709/228 |
| 2004/0073641 | A1 * | 4/2004 | Minhazuddin et al. ...... | 709/223 |

OTHER PUBLICATIONS

Baugher, The Secure Real-Time Transport Protocol, Jun. 2002, Internet Engineering Task Force, pp. 1-48.*
Chang, Rocky; Fung, King. *Transport Layer Proxy for Stateful UDP Packet Filtering; pp. 1-6, IEEE Proceedings*, 2002.
Fung, King; Chang, Rocky. *A Transport-Level Proxy for Secure Multimedia Streams*. pp. 57-67; IEEE Internet Computing, Nov.-Dec. 2000.
Knobbe, Roger; Purtell, Andrew; Schwab, Stephen. *Advanced Security Proxies: An architecture and Implementation for High Performance Network Firewalls.*
Pan, Ping; Schulzrinne, Henning. YESSIR: *A Simple Reservation Mechanism for the Internet*. pp. 1-25. Aug. 1, 1997.
Smith, Robert; Bhattacharya, Sourav. *A Protocol and Simulation for Distributed Communicating Firewalls*. pp. 74-79, IEEE 1999.
Stempel, Steffen. *Ip Access-An Internet Service Access System for Firewall Installations*. pp. 31-41; IEEE 1995.

* cited by examiner

*Primary Examiner*—Benjamin E Lanier
(74) *Attorney, Agent, or Firm*—Perkins Coie LLP

(57) ABSTRACT

Enabling media (audio/video) scenarios across firewalls typically requires opening up multiple UDP ports in an external firewall. This is so because RTP (Real Time Protocol, RFC 1889), which is the protocol used to carry media packets over IP network, requires a separate UDP receive port for each media source. Opening up multiple media ports on the external firewall is something that administrators are not comfortable doing as they consider it security vulnerability. The system and method according to the invention provides an alternate mechanism which changes RTP protocol a little and achieves a goal of traversing firewalls for media packets using a fixed number, namely two, of UDP ports.

12 Claims, 8 Drawing Sheets

SYSTEM AND METHOD FOR EFFICIENTLY TRANSFERRING MEDIA ACROSS FIREWALLS

BACKGROUND

1. Technical Field

The invention is related to a system and method that encodes and decodes data. More particularly, this invention is related to a system and method for encoding and/or decoding media data in order to efficiently traverse firewalls that protect a computer network.

2. Related Art

A firewall is a security system intended to protect an organization's computer network against external threats, such as hackers, coming from another network, such as the Internet. A firewall prevents computers in the organization's network from communicating directly with computers external to the network and vice versa. Instead, all communication is routed through a proxy server outside of the organization's network, and the proxy server decides whether it is safe to let a particular message or file pass through to the organization's network.

A typical corporate network, or similar network, employs an external firewall, a Demilitarized Zone (DMZ) and an internal firewall. The DMZ consists of one or more servers deployed in a network that typically have a public interface which is used by clients in the Internet to access a service, and a private interface which is used by the one or more servers to access resources in the corporate network, also referred to as the internal network. An internal firewall is a firewall deployed at the inner edge of a corporation's network. This firewall prevents access of computers in the DMZ to sensitive information/resources in the corporate network. The public interface is protected by the external firewall and the internal firewall prevents traffic from the internal interface to enter the corporate network.

Server machines placed in the DMZ have very limited access to computers in the internal network. For security reasons, on the internal firewall, network administrators allow outbound Transmission Control Protocol (TCP) connections (from inside the internal network to the outside) and possibly allow opening User Datagram Protocol (UDP) ports. For an external firewall only a limited number of ports are allowed to be opened.

Media packets are typically transferred across the Internet using Real-time Transport Protocol (RTP). RTP provides end-to-end network transport functions suitable for applications transmitting real-time data such as audio, video or simulation data, over multicast or unicast network services. The data transport is augmented by a Real-Time Control Protocol (RTCP) to allow monitoring of the data delivery in a manner scalable to large multicast networks, and to provide minimal control and identification functionality. RTP and RTCP are designed to be independent of the underlying transport and network layers.

Sending media (e.g., audio/video) across firewalls via RTP typically requires opening up multiple ports, called UDP ports, in the external firewall. This is so because RTP (Real Time Protocol, RFC 1889), which is the protocol used to carry media packets over an IP network, requires a separate UDP receive port for each media source. That is, each client receiving media data requires its own UDP receive port in the external firewall. Opening up multiple media ports in the external firewall is something that network administrators are not comfortable doing as it presents a security vulnerability.

To provide secure transmission of media packets over the Internet using Internet Protocol (IP), a client (sender) typically encrypts the packets before transmission to provide confidentiality and integrity. Security at the DMZ is of utmost importance since the servers in the DMZ have an interface in the public network, i.e., with an IP address routable over the public IP Internet. This opens the servers in the DMZ up to attacks from any malicious computer user on the Internet. The attacks can be of various types, such as, for example, a Man-in-the-middle attack (when an attacker is able to intercept traffic by placing themselves in the middle of the conversation) or a Denial of Service attack (any attack used to achieve the disruption of any service to legitimate users). A server called a media-relay server is one of the servers deployed in the DMZ of a corporate or other network. This media-relay server receives media traffic from external clients (clients in the public internet or clients in a different network) and, after enforcing security, relays the traffic to clients inside the corporate network. The media-relay server maintains a Security Association (SA) for each corporate client behind it that it may relay media packets to. The SA for each client includes the encryption keys used to decrypt the packets. The SA is established during the dialog setup between the sending and receiving clients. Messages in the dialog traverse through the Media-Relay server in the signaling path when the dialog is being setup between the clients. It is assumed that the information exchanged to setup the SA in the signaling path is secure.

Two UDP ports (one each for RTP and RTCP as described in RFC 1889) are typically opened in the external firewall for each client receiving media data. Therefore, a variable number of ports must be opened based in the external firewall based on the number of clients connecting. Presently, a SA for each client is associated with the UDP ports for that client. This SA is used to decrypt the packet as explained in the previous paragraph via conventional methods. As a result, if only a fixed small number of UDP ports are allowed to be opened on the external firewall, regardless of the number of actual clients trying to receive media data across it, there is no way to associate the packets arriving at the UDP ports to a given client. A mechanism is required at the server to retrieve the SA of the client to which the media traffic is supposed to be forwarded. In order to limit the number of open ports on the external firewall, a different mechanism than is presently available is required.

Therefore, what is needed is a system and method for allowing data to traverse a firewall using only a small fixed number of open media ports (e.g., UDP ports) on the external firewall, regardless of how large the number of actual clients is that are attempting to receive media data through the firewall.

SUMMARY

The system and method of the present invention allows only a small fixed number of ports for sending media data, for example, two UDP ports, to be opened in an external firewall, regardless of how large the number of actual clients is receiving media data through the firewall, while still providing the ability to associate the packets arriving at the ports to a particular client. The system and method of the invention provides a mechanism at the server to retrieve a Security Association (SA) indicator of the client to which the media traffic is supposed to be forwarded, while still maintaining a more secure network environment than is currently experienced when sending media data via Real-Time Protocol (RTP) and Real-Time Control Protocol (RTCP).

In one embodiment, the system and method of the invention uses the Synchronization Source Identifier (SSRC) in the Real-Time Protocol (RTP) header (RFC 1889) to identify the client. Since RTP packets are encrypted end-to-end, it is not possible to retrieve the SSRC identifier from the encrypted packet itself. To resolve this encryption issue different approaches are taken depending on the location of the client relative to the external and internal firewalls.

For the scenario where the sending client is in the public Internet, the following steps are taken to enforce security at a media-relay server. Initially, after the client sends a media packet to a network, the client's Security Association (SA) is retrieved by the media-relay client using the source information to include source IP address and port pair (e.g., Source (IP, Port)) of the RTP packet. If no SA exists, the packet is dropped. If a SA does exist, a copy of the packet is made and the packet is then decrypted. Then the SSRC inside the RTP packet is compared with the SSRC stored in the SA during the signaling phase when a dialog between the receiving client and the sending client was set up. If the two SSRC values are not equal the packet is dropped. If the SSRC values are equal, the packet is forwarded to the receiving client in a corporate or other network behind a firewall. It should be noted that the RTCP also has the same packet format as RTP, so similar processing applies to data transfer using RTCP.

In another embodiment of the invention, the client is in a corporate network behind another media-relay server. In this scenario, RTP packets are modified, where the modified RTP can be referred to as RTP', at a first media-relay server by adding the SSRC value (32 bits) outside the encrypted packet. This 32 bit value is in the clear and outside (preferably occupying the higher order 32 bits) the encrypted RTP packet. So, a RTP' packet=SSRC+RTP packet, where '+' denotes concatenation. At a second media-relay server, security is enforced by taking the following steps. Initially, once a client in the network behind the first media relay server sends a media packet, the client's SA is retrieved using the outer SSRC which is in the clear and not encrypted. If no such SA exists, the packet is dropped. If a SA does exist, a copy of the packet is made, the packet is decrypted, and the SSRC inside the RTP packet is compared with the SSRC outside the packet. If the two values are not equal the packet is dropped. If the SSRC values are equal, the packet is forwarded to the corporate client.

There are three different variations for this embodiment which result in different configurations of the internal and/or external firewalls.

The first variation exists where RTP is used between a sending client in a first network and a first media-relay server and RTP' is used between the first media-relay server and a second media-relay server in a second network. This enables the transfer of media between two networks by opening only two UDP ports on the external firewall and multiple UDP ports on the internal firewall.

The second variation exists where RTP' is used between a sending client in a first network and a first media-relay server and also between the first media-relay server and a second media-relay server of a different network. This enables media to be transmitted between two corporations or networks by opening only two UDP ports on the external firewall and two UDP ports on the internal firewall.

A third variation exists where two media-relay servers are deployed in a corporation, one in the DMZ and one in the internal network. The servers communicate via a means of secure communication such as, for example a Mutual Transport Layer Security (MTLS) channel (e.g., the packets are secured at the transport layer) and all media is forwarded through a Transmission Control Protocol (TCP) connection between the servers. Other methods of secure communication could be used, however, such as IPSEC, Kerberos, and so forth. Media is transmitted between the media-relay servers deployed in the DMZs of two different networks using RTP'. In this deployment, two UDP ports are opened on the external firewall of a network and one TCP port is opened on the internal firewall.

In the above embodiments, corporate networks are occasionally referred to, however, the system and method of the invention applies to any situation where UDP based communication or UDP-like protocol is desired between two independent networks protected using firewalls which prevent the free flow of UDP packets between these two networks.

Media (especially audio) is very sensitive to latencies of the transmission of the digitized media packets. Any reduction in the latency is very useful for real-time media transfer. Encryption and decryption are CPU intensive operations and it is important to minimize these operations to improve latency and media quality. Towards this end, a further optimization is made in the system and method according to the invention by changing a client to use a server-assigned SSRC in the media packets that it sends. This improves performance in the send path since each packet no longer needs to be decrypted at the sending media-relay server. The media-relay server just remembers the SSRC it has assigned to the media source and adds that SSRC to the packet to produce the RTP' from the RTP packet.

In addition to the just described benefits, other advantages of the present invention will become apparent from the detailed description which follows hereinafter when taken in conjunction with the accompanying drawing figures.

DESCRIPTION OF THE DRAWINGS

The specific features, aspects, and advantages of the present invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings, which form a part hereof, and in which is shown by way of illustration specific embodiments in which the invention may be practiced. It is understood that other embodiments may be utilized and structural changes may be made without departing from the scope of the present invention.

1.0 Exemplary Operating Environment

Figure 1:
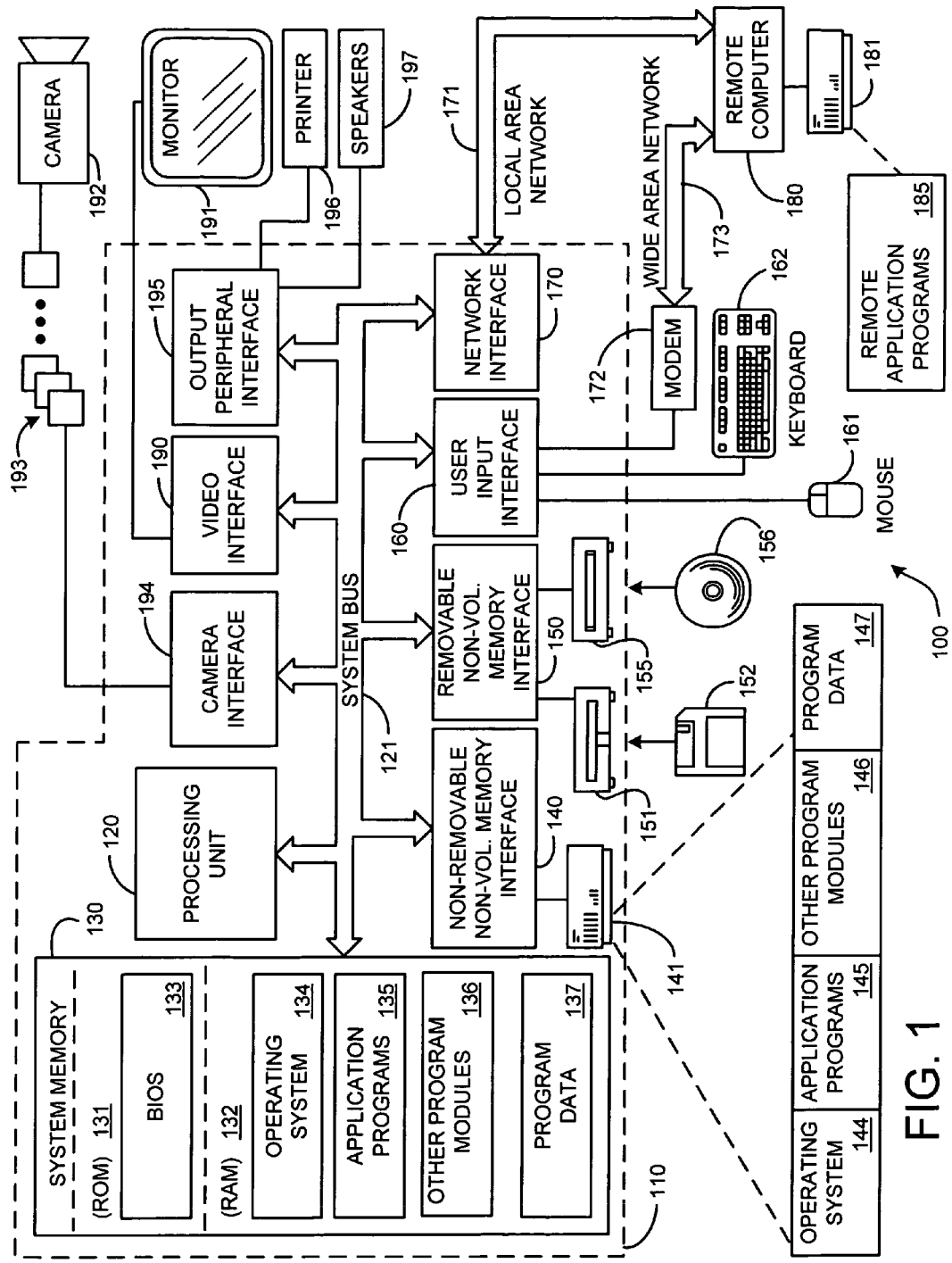
FIG. 1 is a general system diagram depicting a general-purpose computing device constituting an exemplary system for implementing the present invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. With reference to FIG. 1, an exemplary system for implementing the invention includes a general-purpose computing device in the form of a computer 110.

Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

Further, the computer 110 may also include, as an input device, a camera 192 (such as a digital/electronic still or video camera, or film/photographic scanner) capable of capturing a sequence of images 193. Further, while just one camera 192 is depicted, multiple cameras could be included as input devices to the computer 110. The use of multiple cameras provides the capability to capture multiple views of an image simultaneously or sequentially, to capture three-dimensional or depth images, or to capture panoramic images of a scene. The images 193 from the one or more cameras 192 are input into the computer 110 via an appropriate camera interface 194. This interface is connected to the system bus 121, thereby allowing the images 193 to be routed to and stored in the RAM 132, or any of the other aforementioned data storage devices associated with the computer 110. However, it is noted that image data can be input into the computer 110 from any of the aforementioned computer-readable media as well, without requiring the use of a camera 192.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining part of this description will be devoted to a discussion of the program modules and processes embodying the present invention.

2.0 A System and Method for Efficiently Transferring Media Across a Firewall

2.1 Background-Anatomy of a Firewall

Figure 2:
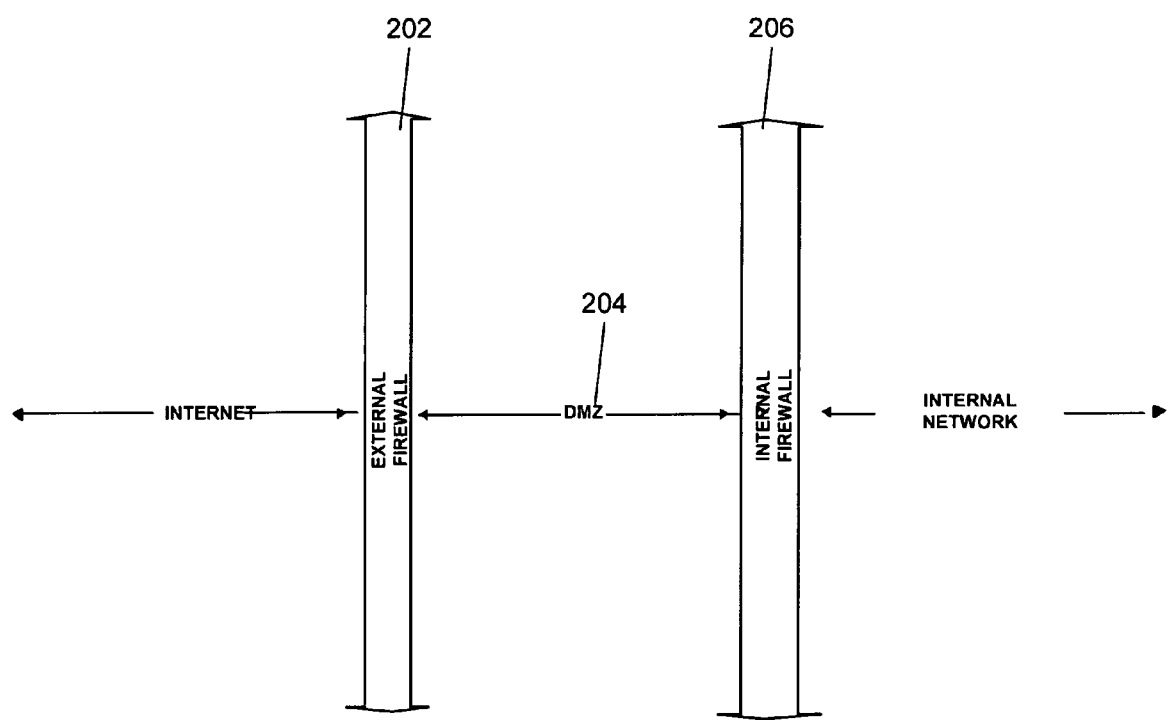
FIG. 2 illustrates a typical network firewall configuration.

A typical network 200, such as for example a corporate network, as shown in FIG. 2, employs an external firewall 202, a demilitarized zone (DMZ) 204 and an internal firewall 206. A DMZ 204 refers to one or more servers, called media-relay servers, deployed in a network that typically have a public interface which is used by clients in the Internet to access services, and a private interface which is used by the media-relay server to access resources in the network 200, also referred to as the internal network. A media-relay server receives media traffic from external clients (clients in the public internet or clients in a different network) and, after enforcing security, relays the traffic to clients inside the internal network. Each media-relay server also maintains a Security Association (SA) for each client that it may relay media packets to. The SA for each client includes the encryption keys used to decrypt the packets. The SA is established during the signaling path when the dialog between the two clients is established and it is assumed that the information exchanged to setup the SA in the signaling path is secure. The internal firewall 206 is a firewall deployed at the inner edge of a network. This firewall prevents access of machines in the DMZ to sensitive information/resources in the internal network. The public interface is protected by the external firewall 202 and the internal firewall 206 prevents traffic from the internal interface to enter the internal network.

2.2 System Overview.

The system and method of the present invention allows only a fixed number ports for transferring media data (e.g., two UDP ports) to be opened on an external firewall, regardless of how large the number of actual clients is that are trying to receive media data, while still providing the ability to associate the packets arriving at the ports for transferring media data to a client. The system and method of the invention provides a mechanism at the media-relay server to retrieve the SA of the client to which the media traffic is supposed to be forwarded. This mechanism is described in the following paragraphs.

Figure 3:
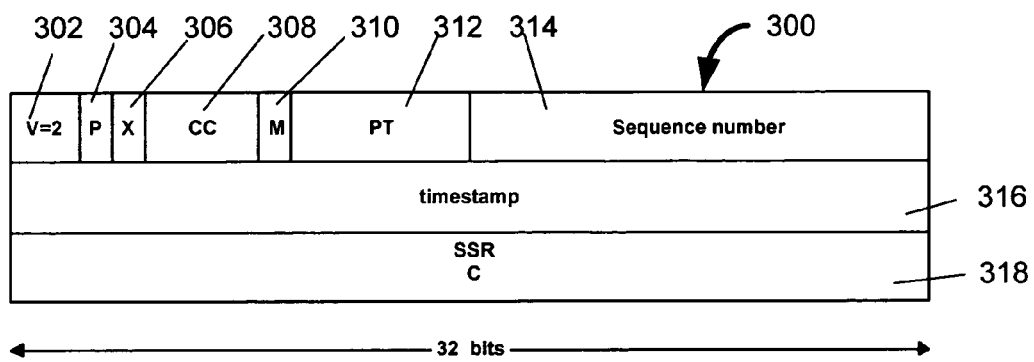
FIG. 3 illustrates the data header format of a typical RTP media message.

In one embodiment, the system and method of the invention uses the Synchronization Source Identifier (SSRC) field in a typical RTP header (RFC 1889) to identify the client sending the media packets. As shown in FIG. 3, a typical RTP header 300 contains:

1) version (V) field 302: This field identifies the version of RTP.

2) padding (P) field 304: If the padding bit is set, the packet contains one or more additional padding octets at the end which are not part of the payload.

3) extension (X) field 306: If the extension bit is set, the fixed header is followed by exactly one header extension.

4) CSRC count (CC) field 308: The CSRC count contains the number of CSRC identifiers that follow the fixed header.

5) marker (M) field 310: The interpretation of the marker is defined by a profile. It is intended to allow significant events such as frame boundaries to be marked in the packet stream.

6) payload type (PT) field 312: This field identifies the format of the RTP payload and determines its interpretation by the application.

7) sequence number field 314: The sequence number increments by one for each RTP data packet sent, and may be used by the receiver to detect packet loss and to restore packet sequence.

8) timestamp field 316: The timestamp reflects the sampling instant of the first octet in the RTP data packet. The sampling instant must be derived from a clock that increments monotonically and linearly in time to allow synchronization and jitter calculations 10) SSRC field 318: The SSRC field identifies the synchronization source.

Since RTP packets are encrypted end-to-end, it is not possible to retrieve the SSRC from the encrypted packet itself. To resolve this encryption issue different approaches are taken depending on where the client is.

2.2 Client is in the Public Internet

Figure 4:
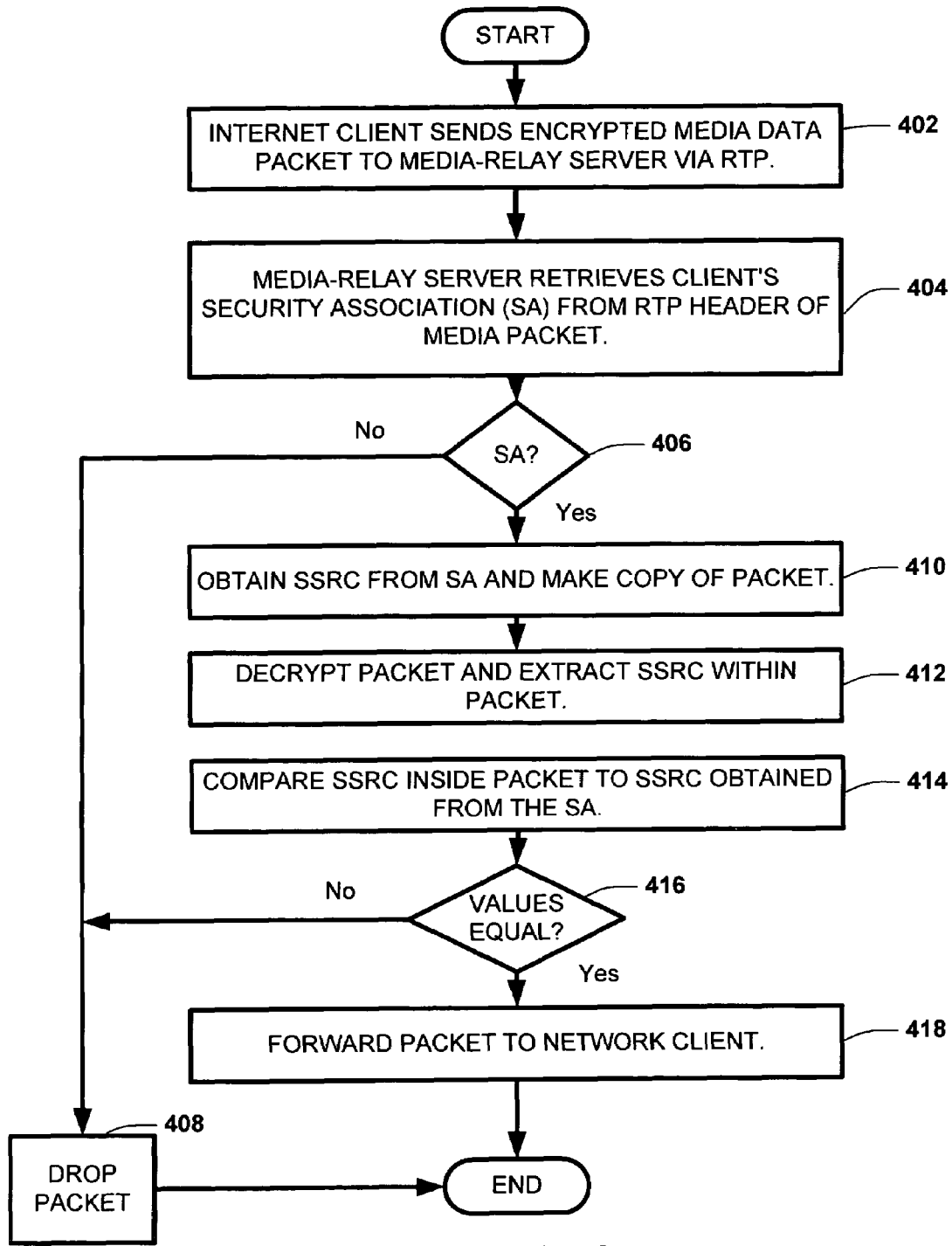
FIG. 4 illustrates an exemplary flow diagram for the general process of an Internet client sending media data to a corporate network according to the present invention.

For the scenario where the client sending the data is in the public internet, the following process actions are taken to enforce security at the media-relay server. As shown in FIG. 4, process action 402, an Internet client sends media data to the internal network via a media-relay server. The sending client's SA is retrieved using the Source (IP, Port) pair of the RTP packet, as shown in process action 404. If no SA exists, the packet is dropped (process actions 406, 408). If an SA does exist, a copy of the packet is made (process action 410). The packet is then decrypted (process action 412), and the SSRC inside the RTP packet is compared with the SSRC stored in the SA during the signaling phase when a dialog between the receiving client and the sending client was set up (process action 414). If the two values are not equal the packet is dropped (process action 416, 408). If the SSRC values are equal, the packet is forwarded to the corporate client (process actions 416 and 418).

It should be noted that since RTP and RTCP are Internet standardized protocols, it is preferable to use the formats as specified in these standards for communication between clients and servers. From practical logistical and deployment perspectives, it is harder to update clients compared to servers. So, the system and method according to the invention strives to keep the protocol between client and server as RTP, whereas it extends the standard for communication between media-relay servers for solving a real world problem.

Figure 5:
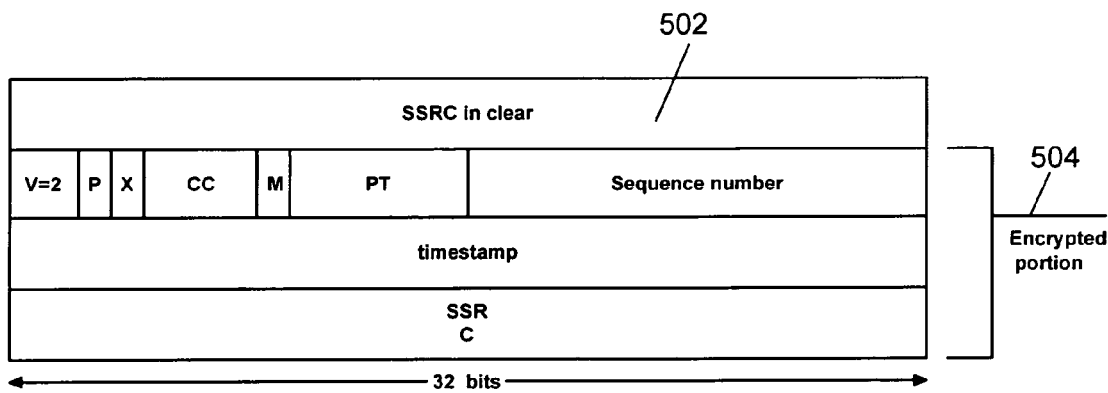
FIG. 5 illustrates the data header format of a modified RTP media message according to the present invention.
Figure 6:
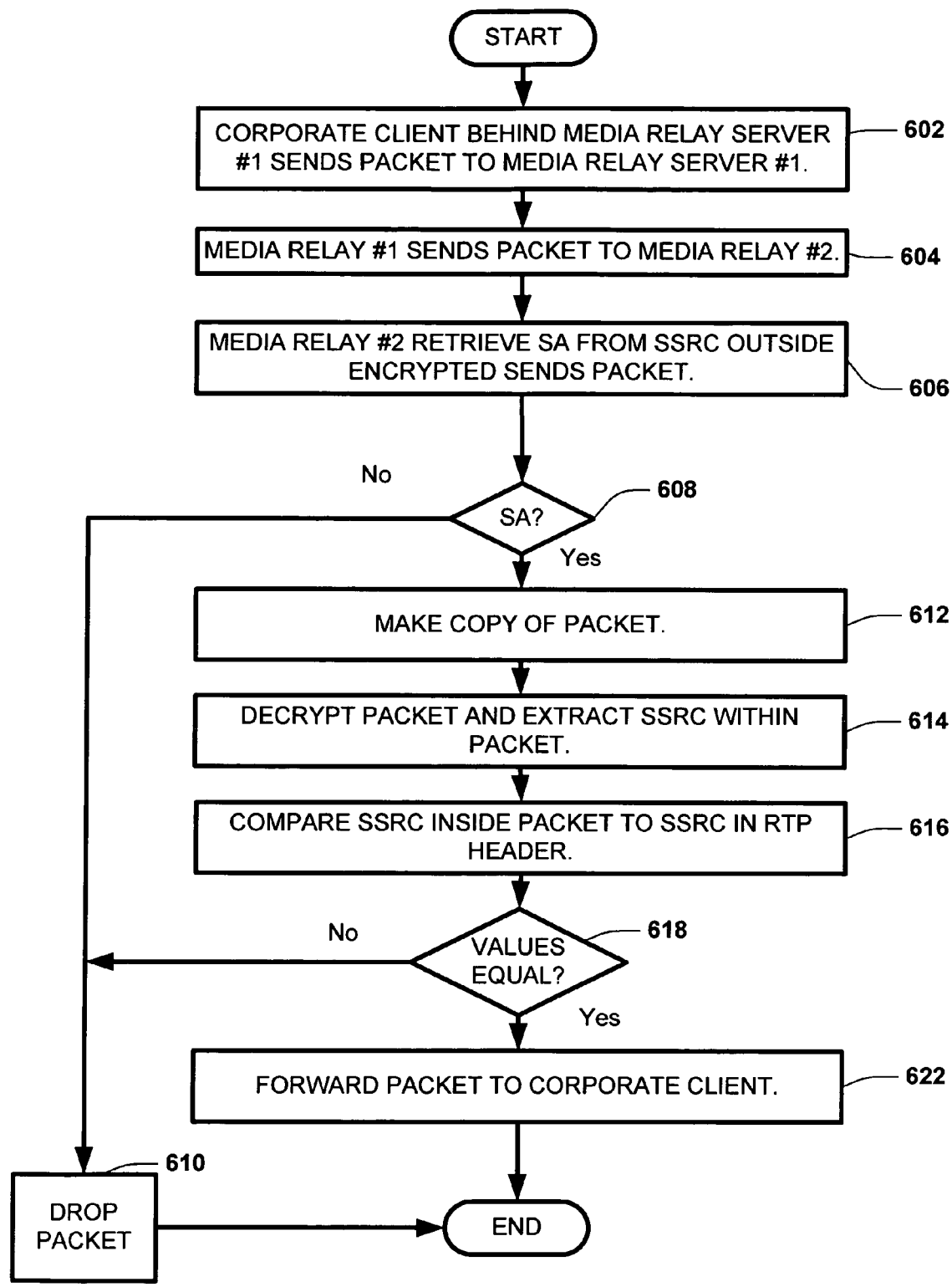
FIG. 6 illustrates a flow diagram for the process where a client is in a corporate network and is sending media data to another corporate network according to the present invention.

2.3 Modified RTP Data Header Where Sending Client is in a Corporate Network Behind Another Media-Relay Server There is also a case where the sending client is in a corporate network behind another media-relay server. In this scenario, RTP packets are modified (where the modified RTP can be referred to as RTP') at the first media-relay server by adding the SSRC value (32 bits) outside the encrypted packet. The remaining fields of the RTP remain the same. Refer to FIG. 5 for a better understanding of the format of RTP'. As shown in FIG. 5, the SSRC field 502 is also in the clear and outside (preferably occupying the higher order 32 bits to simplify the lookup of the SSRC in the packet and also to locate it in a well known place in the packet) the encrypted RTP packet 504. So, a RTP' packet=SSRC+RTP packet, where '+' denotes concatenation. At the second media-relay server, security is enforced by taking the following steps. Initially, as shown in FIG. 6, a network client sends a media transmission to a first media-relay server (process action 602) who forwards it to the second media-relay server (process action 604). At the second media-relay server, the sending client's SA is retrieved using the outer SSRC which is in the clear and not encrypted (process action 606). If no such SA exists, the packet is dropped (process action 608, 610). If a SA does exist, a copy of the packet is made (process action 612), the packet is decrypted (process action 614), and the SSRC inside the RTP packet is compared with the SSRC outside the packet (process action 616). If the two values are not equal the packet is dropped (process action 618, 610). If the SSRC values are equal, the packet is forwarded to the corporate client (process action 618, 620) by the second media relay server.

There are 3 different variations for this scenario which result in different configurations of the firewall.

2.3.1 Two or More Networks

Figure 7:
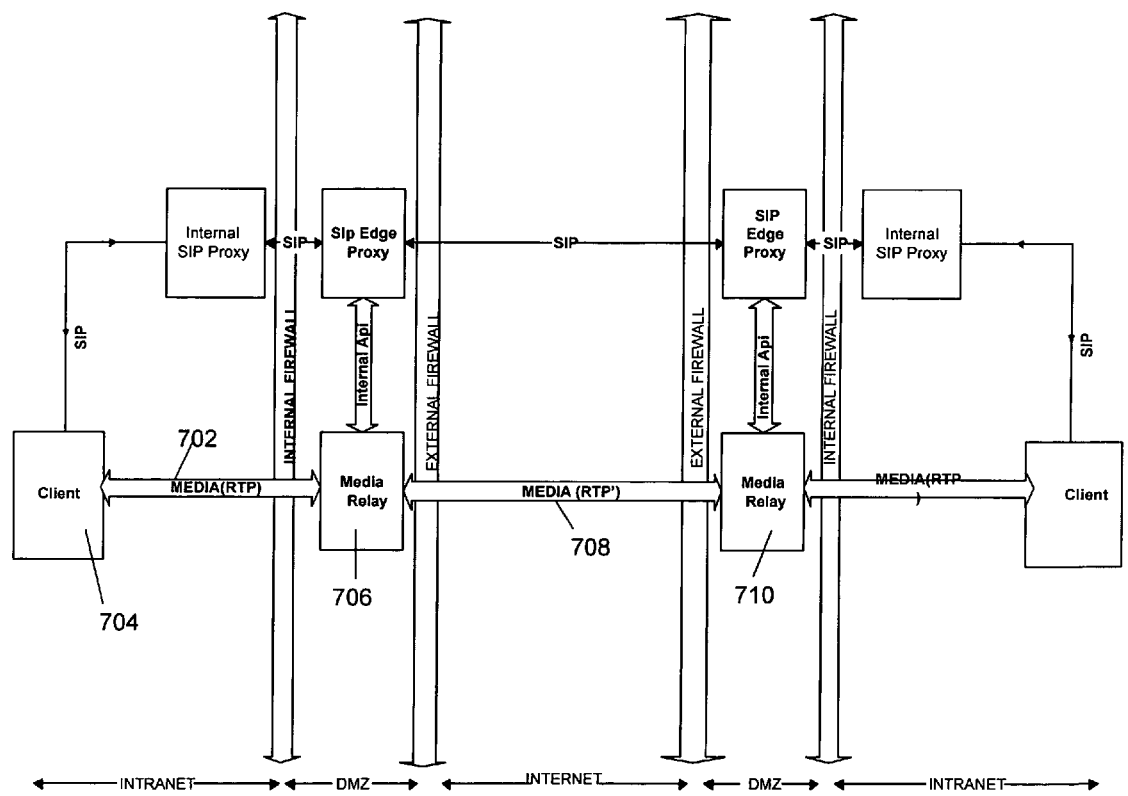
FIG. 7 illustrates a diagram of a firewall configuration where there is a transfer of media between two networks by opening only two UDP ports on the external firewall and multiple UDP ports on the internal firewall according to the present invention.

FIG. 7 shows the topology of a deployment where RTP 702 is used between an internal network client 704 and a first media-relay server 706 and RTP' 708 is used between the first media-relay server 7-6 and a second media-relay server 710. This enables media between two networks to be transferred by opening only two UDP ports on the external firewall and multiple UDP ports on the internal firewall. Although FIGS. 7, 8 and 9 show the clients connected to the Internal SIP Proxy other SIP proxies for the signaling path could be employed.

2.3.2 Two or More Networks and an Internal Network Client

Figure 8:
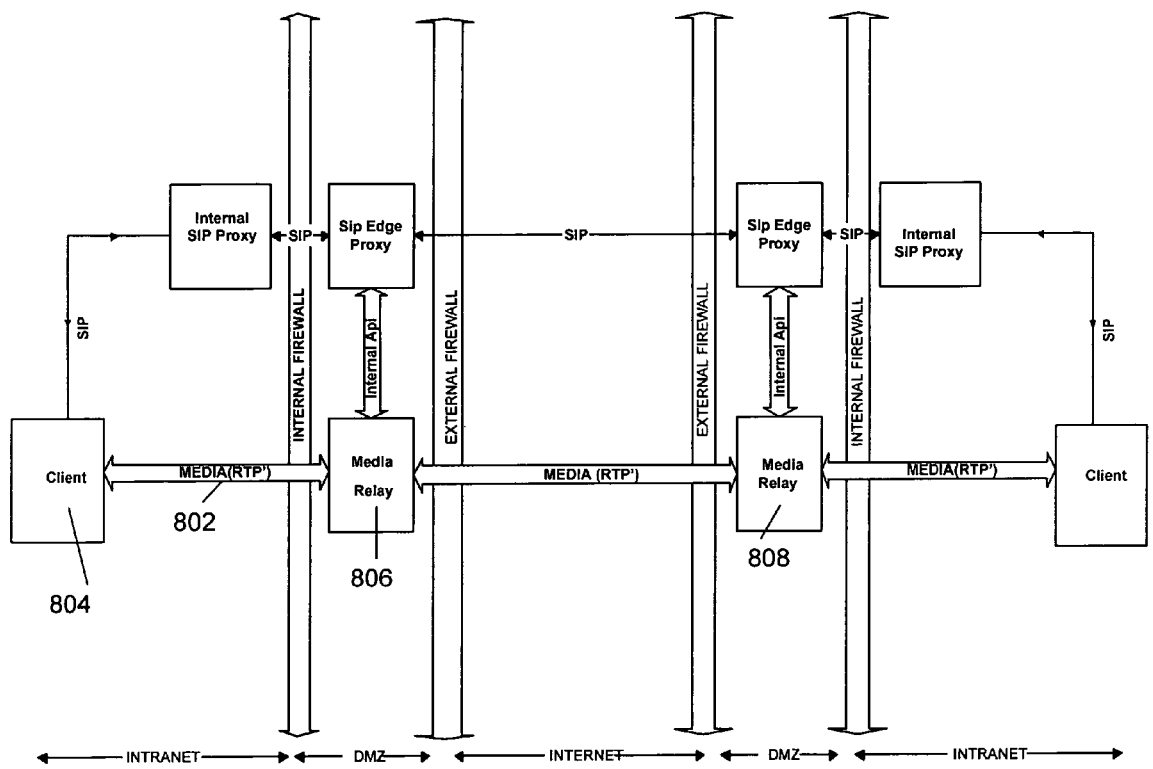
FIG. 8 illustrates a diagram of a firewall configuration where there is a transfer of media between two networks by opening only two UDP ports on the external firewall and two UDP ports on the internal firewall according to the present invention.
Figure 9:
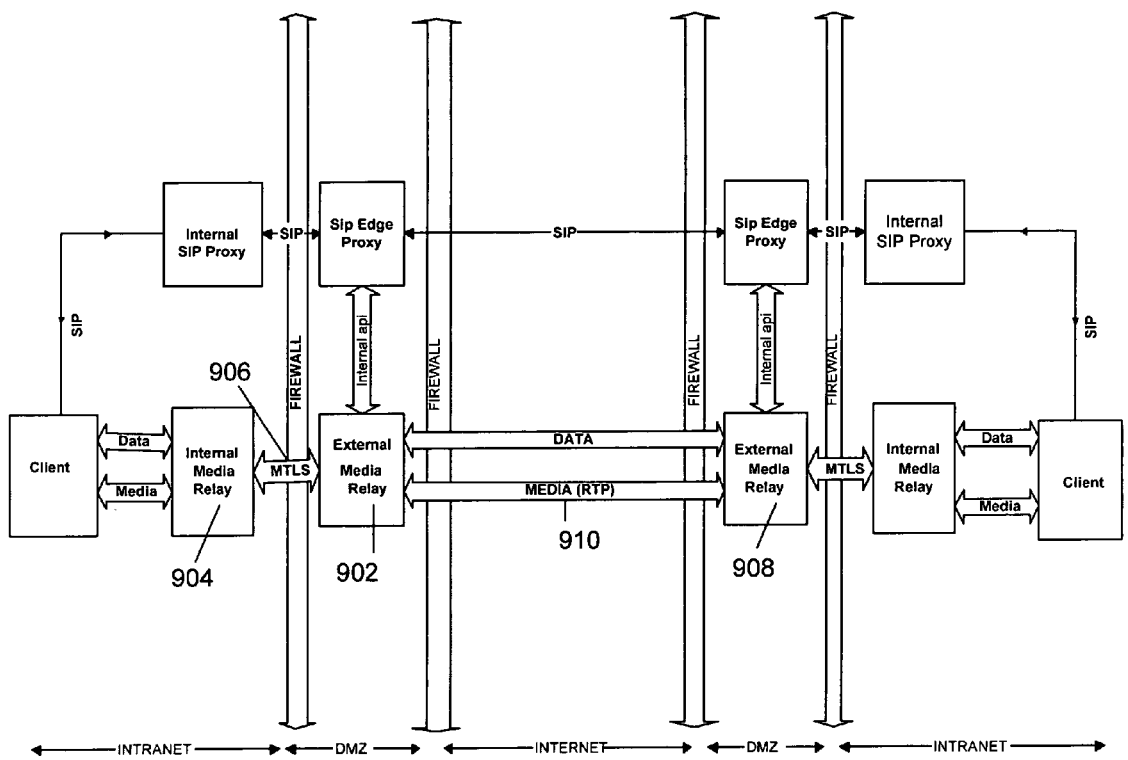
FIG. 9 illustrates a diagram of a firewall configuration where there is a transfer of media between the media-relay servers deployed in the DMZs of two different networks using RTP". In this deployment, two UDP ports are opened on the external firewall of a network and one TCP port is opened on the internal firewall.

FIG. 8 shows the topology of a deployment where RTP' 802 is used between a client 804 and first media-relay server 806 and also between the first media-relay server and a second media-relay server 808 of a different network. This enables media to be transmitted between two networks by opening only two UDP ports on the external firewall and two UDP ports on the internal firewall.

2.3.3 Two Media-Relay Servers—One in Internal Network and One in DMZ

FIG. 9 shows the topology of a deployment where two media-relay servers are deployed in a network, one in the DMZ 902 and one in the internal network 904. This deployment is targeted at those networks where it is undesirable to open up a variable number of UDP ports between the media-relay server in the DMZ and internal network. The servers communicate via a Mutual Transport Layer Security channel, or other secure communication channel, and all media is forwarded through a TCP connection between the servers. Media is transmitted between the media-relay servers 902, 908 deployed in the DMZs of two different corporations using RTP' 910. In this deployment, two UDP ports are opened on the external firewall of a corporation and one TCP port is opened on the internal firewall. IT administrators are more willing to open a TCP port from inside to outside as this allows standard TCP security wherein a packet can be sent inside only if a client from inside sent a packet to outside the network. So, the option to use TCP will allow networks where they have standardized on TCP-based connectivity to the outside network.

2.4 Alternate Embodiment Wherein Client Uses Server-Assigned SSRC

Media, especially audio, is very sensitive to latencies in the transmission of the digitized packets. Any reduction in the latency is very useful for real time media. Encryption and decryption are CPU-intensive operations and it is important to minimize these operations to improve latency and media quality. Towards this end, a further optimization can be made by the system and method according to the invention by changing the client to use a server-assigned SSRC in the media packets that it sends. This improves performance in the send path since the packet no longer needs to be decrypted at the sending media-relay server. The media-relay-server just remembers the SSRC it has assigned to the media source and adds that SSRC to the packet to produce the RTP' from the RTP packet.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented process for receiving from a plurality of sending clients media packets across a firewall sent to a single destination address and a single destination port of a firewall, each media packet not including an unencrypted Synchronization Source Identifier (SSRC) but including an encrypted Synchronization Source Identifier, comprising the process actions of:

establishing a plurality of security associations (SAs) for dialogs between sending clients and receiving clients, each SA including source information of a sending client and an indication of a receiving client;

receiving from a sending client an encrypted media packet sent using Real-time Transport Protocol (RTP) message format at a media-relay server, the encrypted media packet being sent to the destination address and the destination port;

determining whether the sending client's Security Association (SA) exists using the sender's source information received with the media packet the sender's source information being unencrypted and including a source address;

if no SA exists, dropping the media packet at the media-relay server; and if a SA does exist, decrypting the media packet including decrypting a media packet Synchronization Source Identifier included in the media packet;

obtaining obtained Synchronization Source Identifier from the SA;

comparing the media packet Synchronization Source Identifier included in the decrypted media packet with the obtained Synchronization Source Identifier obtained from the SA;

if the media packet Synchronization Source Identifier included in the decrypted packet does not match the obtained Synchronization Source Identifier obtained from the SA, dropping the media packet; and if the media packet Synchronization Source Identifier in the decrypted packet matches to the obtained Synchronization Source Identifier obtained from the SA, forwarding the packet to a receiving client indicated in the SA based on the sender's source information wherein a plurality of sending clients send media packets with different encrypted Synchronization Source Identifiers to the destination address and the destination port.

2. The computer-implemented process of claim 1 wherein the source information retrieved by the media-relay server comprises a source Internet Protocol (IP) address and port number found in the RTP message format.

3. The computer-implemented process of claim 1 wherein the media packet comprises audio data.

4. The computer-implemented process of claim 1 wherein the media packet comprises video data.

5. A method in a media-relay server for relaying to receiving clients packets of a real-time transport protocol received from sending clients through a single destination address and a single destination port of a firewall, each packet not including an unencrypted synchronization source identifier but including an encrypted synchronization source identifier, the method comprising:

for each of a plurality of sending clients, establishing a security association for a dialog between the sending client and a receiving client, the security association including an encryption key for decrypting packets sent from the sending client to the receiving client via the destination address and the destination port, an established synchronization source identifier that uniquely identifies the sending client within the dialog, source information of the sending client, and an indication of the receiving client;

receiving from a sending client a datagram of a user datagram protocol sent to the destination address and the destination port, the datagram including an encrypted packet and source information of the sending client, the source information of the sending client including a unencrypted source address; and upon receiving the datagram, when no security association has been established that includes the source information of the received datagram, dropping the encrypted packet; and when a security association has been established that includes the source information of the received datagram, decrypting the encrypted packet using the encryption key of the established security association including decrypting a packet synchronization source;

when the decrypted packet synchronization source identifier of the decrypted packet and the established synchronization source identifier of the established security association do not match, dropping the decrypted packet; and when the decrypted packet synchronization source identifier of the decrypted packet and the established synchronization source identifier of the established security association do match, forwarding the decrypted packet to the receiving client indicated in the established security association.

6. The method of claim 5 including receiving from each of the plurality of sending clients datagrams sent to the destination address and the destination port.

7. The method of claim 5 wherein the media-relay server is connected to a external firewall through which datagrams are received from sending clients and an internal firewall through which packets are forwarded to receiving clients.

8. The method of claim 5 wherein the source information is a source address and a source port of the datagram.

9. A media-relay server for relaying to receiving clients packets of a real-time transport protocol received from sending clients through a single destination address and a single destination port of a firewall, each packet not including an unencrypted synchronization source identifier but including an encrypted synchronization source identifier, the media-relay server comprising:
  security associations established for sending clients and receiving clients, the security association for a sending client including, an established synchronization source identifier that uniquely identifies the sending client within the dialog, source information of the sending, and an indication of the receiving client;
  a component that receives from a sending client an encrypted packet of the real-time transport protocol and source information of the sending client sent by the sending client to the destination address and the destination port, the source information of the sending client including a unencrypted source address; and
  a component that
    when no security association has been established that includes the received source information, drops the encrypted packet; and
    when a security association has been established that includes the received source information,
      decrypts the encrypted packet including decrypting a packet synchronization source identifier included in the packet to a decrypted packet synchronization source identifier;
      when a decrypted packet synchronization source identifier of the decrypted packet and an established synchronization source identifier of the established security association do not match, drops the decrypted packet; and
      when the decrypted packet synchronization source identifier of the decrypted packet and the established synchronization source identifier of the established security association do match, forwards the decrypted packet to the receiving client indicated in the established security association.

10. The media-relay server of claim 9 wherein packets are received from each of the plurality of sending clients sent to the destination address and the destination port.

11. The media-relay server of claim 9 wherein the media-relay server is connected to a external firewall through which encrypted packets are received from sending clients and an internal firewall through which decrypted packets are forwarded to receiving clients.

12. The media-relay server of claim 9 wherein the source information is a source address and a source port of the received packet.

* * * * *

UNITED STATES PATENT AND TRADEMARK OFFICE
CERTIFICATE OF CORRECTION

PATENT NO. : 7,574,736 B2
APPLICATION NO. : 10/792349
DATED : August 11, 2009
INVENTOR(S) : Salapaka et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 844 days.

Signed and Sealed this

Seventh Day of September, 2010

David J. Kappos
*Director of the United States Patent and Trademark Office*